United States Patent [19]
Kamimoto et al.

[11] Patent Number: 5,375,163
[45] Date of Patent: Dec. 20, 1994

[54] MULTI-CHANNEL CORDLESS TELEPHONE SYSTEM FOR MAINTAINING MASTER-SLAVE COMMUNICATION

[75] Inventors: Kouichi Kamimoto; Katsuyuki Kajiwara, both of Fukuoka, Japan

[73] Assignee: Matsushita Electric Industrial Co., Ltd., Osaka, Japan

[21] Appl. No.: 870,813

[22] Filed: Apr. 20, 1992

[30] Foreign Application Priority Data

Apr. 25, 1991 [JP] Japan .................................. 3-095395
Apr. 25, 1991 [JP] Japan .................................. 3-095410

[51] Int. Cl.⁵ ........................................ H04M 11/00
[52] U.S. Cl. ........................................ 379/61; 379/62; 455/34.1
[58] Field of Search ............................ 379/58, 61, 62; 455/34.1, 34.2, 54.1

[56] References Cited

U.S. PATENT DOCUMENTS

| | | | |
|---|---|---|---|
| 4,694,485 | 9/1987 | Iwase | 379/61 |
| 4,811,380 | 3/1989 | Spear | 379/63 |
| 5,212,808 | 5/1993 | Su et al. | 455/54.1 |
| 5,247,567 | 9/1993 | Hirano | 379/61 |

FOREIGN PATENT DOCUMENTS

| | | |
|---|---|---|
| 3413050 | 10/1984 | Germany . |
| 3514254 | 10/1985 | Germany . |
| 0052933 | 3/1984 | Japan . |
| 0089827 | 4/1989 | Japan . |
| 2138656 | 10/1984 | United Kingdom . |
| 2159372 | 11/1985 | United Kingdom . |

OTHER PUBLICATIONS

Bauer, H. P.: Schnurloses Telefon für den 900-MHz-Bereich, in: ntz, vol. 38, No. 7, 1985, pp. 468–471.
MPT 1375 Common Air Interface Specification, Department of Trade and Industry, London, 1989, pp. i-4-26, Annexes & Appendixes.

*Primary Examiner*—Curtis Kuntz
*Assistant Examiner*—Dwayne D. Bost
*Attorney, Agent, or Firm*—Pollock, Vande Sande & Priddy

[57] ABSTRACT

A cordless telephone provided with a master unit and a slave unit which use a plurality of communication channels. In the case where information indicating a currently used channel or a usually used channel, which has been stored in the master unit, is lost due to, for instance, a power failure, the master unit comes to use an initially used channel, which is preset or determined by performing an operation on an identification code, and enters a standby state. At that time, the slave unit uses the usually used channel. However, when it is detected that the slave unit cannot communicate with the master unit, the slave unit calls the master unit by using the initially used channel. Then, the master and slave units come to perform, for example, an exchange of confirmation data by using the initially used channel. Next, the slave unit transmits to the master unit data indicating that the channel used by the master unit should be changed to the usually used channel. In response to the data, the master unit made to use the usually used channel. Consequently, both of the master and slave units come to use the usually used channel and are able to communicate with each other. Thus, the cordless telephone does not require another power source for a backup circuit. Further, the circuit configuration of the cordless telephone becomes simple.

5 Claims, 5 Drawing Sheets

```
REC    : RECEIVING
TRANS  : TRANSMITTING
UUC    : USUALLY-USED-CHANNEL
IUC    : INITIALLY-USED-CHANNEL
```

MULTI-CHANNEL CORDLESS TELEPHONE SYSTEM FOR MAINTAINING MASTER-SLAVE COMMUNICATION

BACKGROUND OF THE INVENTION

1. Field of The Invention

This invention relates to a cordless telephone which selects and uses one of radio channels.

2. Description of The Related Art

A conventional cordless telephone uses one of several channels, which is selected by a user thereof, to perform communication between a base unit (hereunder often referred to as a master unit) and a portable unit (hereunder frequently referred to as a slave unit) thereof. Such a conventional cordless telephone is provided with a backup circuit in the master unit, powered by a rechargeable battery for forming a backup of information transmitted through the currently used channel to prevent the information from being lost when a power line is disconnected from the master unit. Hereinafter, the conventional cordless telephone will be described by referring to the accompanying drawings.

FIG. 5 is a schematic block diagram for illustrating the configuration of a conventional cordless telephone. Reference numeral 1 designates a master unit connected to a telephone: line; 2 a receiving portion; 3 a transmitting portion; 4 a controlling means; 5 a channel storing portion; and 6 a channel backup circuit.

Further, reference numeral 7 denotes a slave unit; 8 a receiving portion; 9 a transmitting portion; 10 a control means; and 11 a channel storing portion. Further, reference numerals 100 and 200 designate transmission/reception antennas. Incidentally, it is assumed that a radio channel used in this conventional cordless telephone is a specific channel (hereunder referred to as an N-channel or as a channel N).

Even when a Dower lane is disconnected from the master unit during communication between the master and slave units, both of which use the N-channel, the identification of the N-channel is maintained as a channel to be used by the master unit under the action of the channel backup circuit 6 since the identification of the last channel used is stored.

Thereafter, the power line is connected to the master unit again. Subsequently, an operation of transmitting data from the slave unit to the master unit is performed as follows. Namely, the control means 10 of the slave unit 7 transmits to the master unit 1 channel data indicating the N-channel, which is currently used by the slave unit 7, and identification code indicating that the slave unit 7 and the master unit 1 are coupled with each other. The channel data and the identification code are collectively called slave-unit confirming data. Namely, the slave-unit confirming data are transmitted from the slave unit 7 to the master unit 1 in order to confirm that the communication channel used by the slave unit 7 is the same as that used by the master unit 1. When power is lost by the master, such confirmation does not occur until power reconnection.

If the receiving channel used by the master unit 1 is the same as the transmitting channel used by the slave unit 7, the master unit 1 can receive the slave-unit confirming data. When the master unit 1 receives the slave-unit confirming data, the master unit 1 checks whether or not the identification code of the received slave-unit confirming data indicates that the same channel is used by the master and slave units (namely, the slave unit having transmitted the slave-unit confirming data and the master unit are coupled with each other). If it is confirmed that the same channel is used by the master and slave units, the master unit 1 replies by sending the channel data and the identification code to the slave unit 7 as master-unit confirming data. Thus a call can be made (namely, voice communications can be established) therebetween.

Such a conventional cordless telephone, however, has the following drawbacks. Namely, even when the master unit thereof is disconnected from an external power source, the master unit thereof should store information on a channel to be used fop communication between the master unit and a slave unit thereof. Thus the master unit needs a backup circuit. Consequently, the conventional cordless telephone becomes expensive. In addition, the performance of the backup circuit limits a period of time in which information representing a currently used channel is stored therein in case where a power source is disconnected from the master unit. Thus, if the power source is disconnected from the master unit for a long time, the information representing the currently used channel is sometimes lost. This results in that no call can be made between the master and slave units thereafter and the master and slave units cannot revert to a state in which a call can be made therebetween. The present invention is accomplished to eliminate the drawbacks of the conventional cordless telephone.

SUMMARY OF THE INVENTION

It is an object of the present invention to provide a cordless telephone which has no use for a backup circuit for storing channel information representing a currently used channel therein and can easily resume making a call between the master unit and a slave unit thereof even if a power source is disconnected from the master unit thereof and the master unit loses channel information representing a channel having been used by the master unit.

To achieve the foregoing object and in accordance with an aspect of the present invention, there is provided a cordless telephone, wherein the master unit is adapted to receive and transmit a signal through an initially used channel, which is predetermined as initially used between the master unit and a slave unit, when a power source connected thereto is turned on, wherein each of the master unit and the slave unit is provided with a channel setting means which is operated by a user to optionally changing transmitting and receiving channels, wherein in a case where the master unit does not normally reply to the slave unit when the master unit is called by the slave unit (namely, a signal is transmitted by the slave unit to the master unit), a channel changing means of the slave unit changing a current transmitting and receiving channel into the initially used channel and subsequently the slave unit calls the master unit again.

Further, the cordless telephone of the present invention employs an identification code indicating that the slave unit and the master unit are coupled with each other. The master unit is adapted to transmit and receive a signal through an initially used channel indicated by making a calculation on the identification code when the power source connected thereto is turned on.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings. First, the first embodiment of the present invention will be described hereinbelow.

Figure 1:
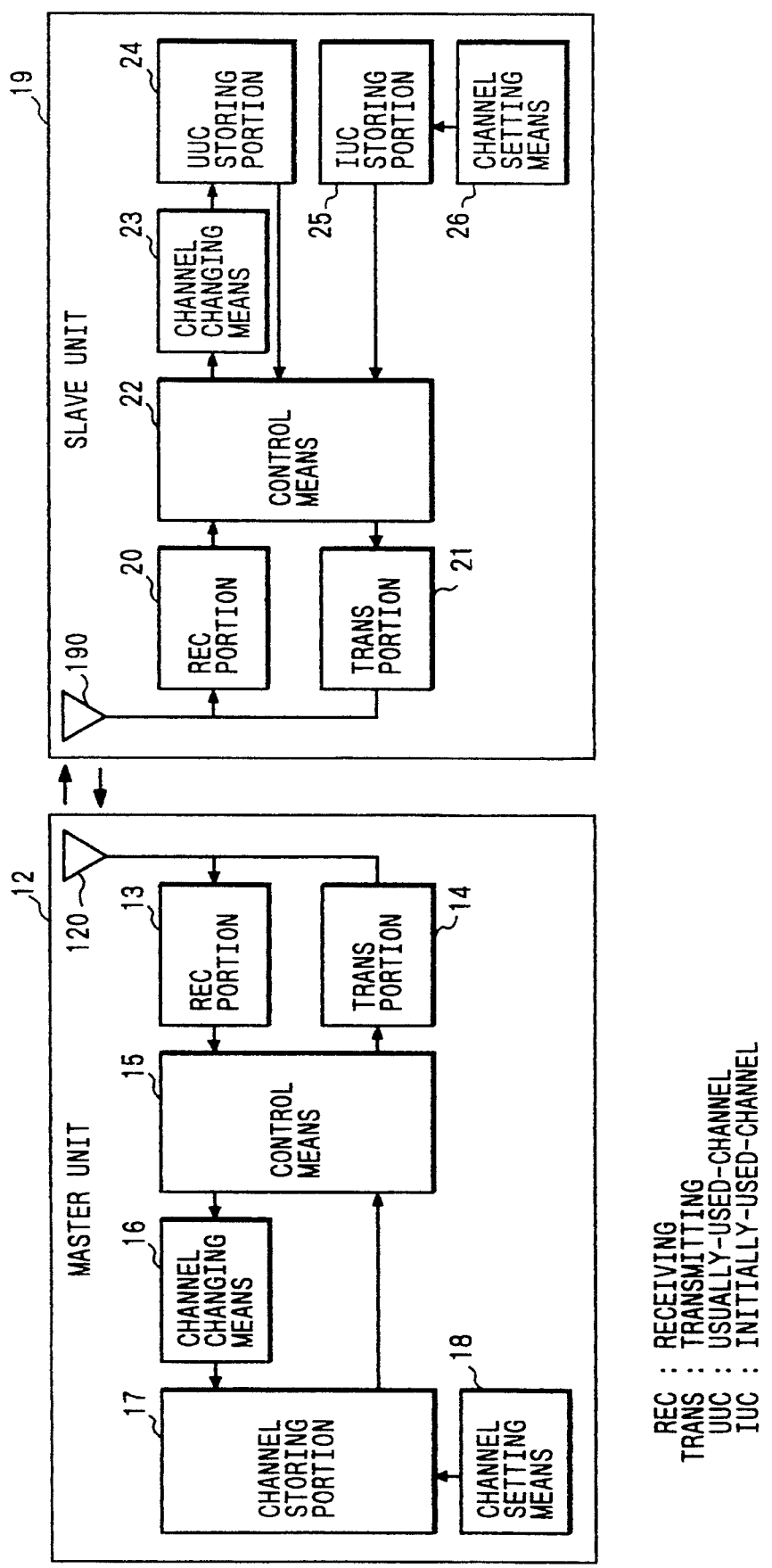
FIG. 1 is a schematic block diagram for illustrating the configuration of a cordless telephone embodying the present invention (hereunder sometimes referred to as a first embodiment)
Figure 2:
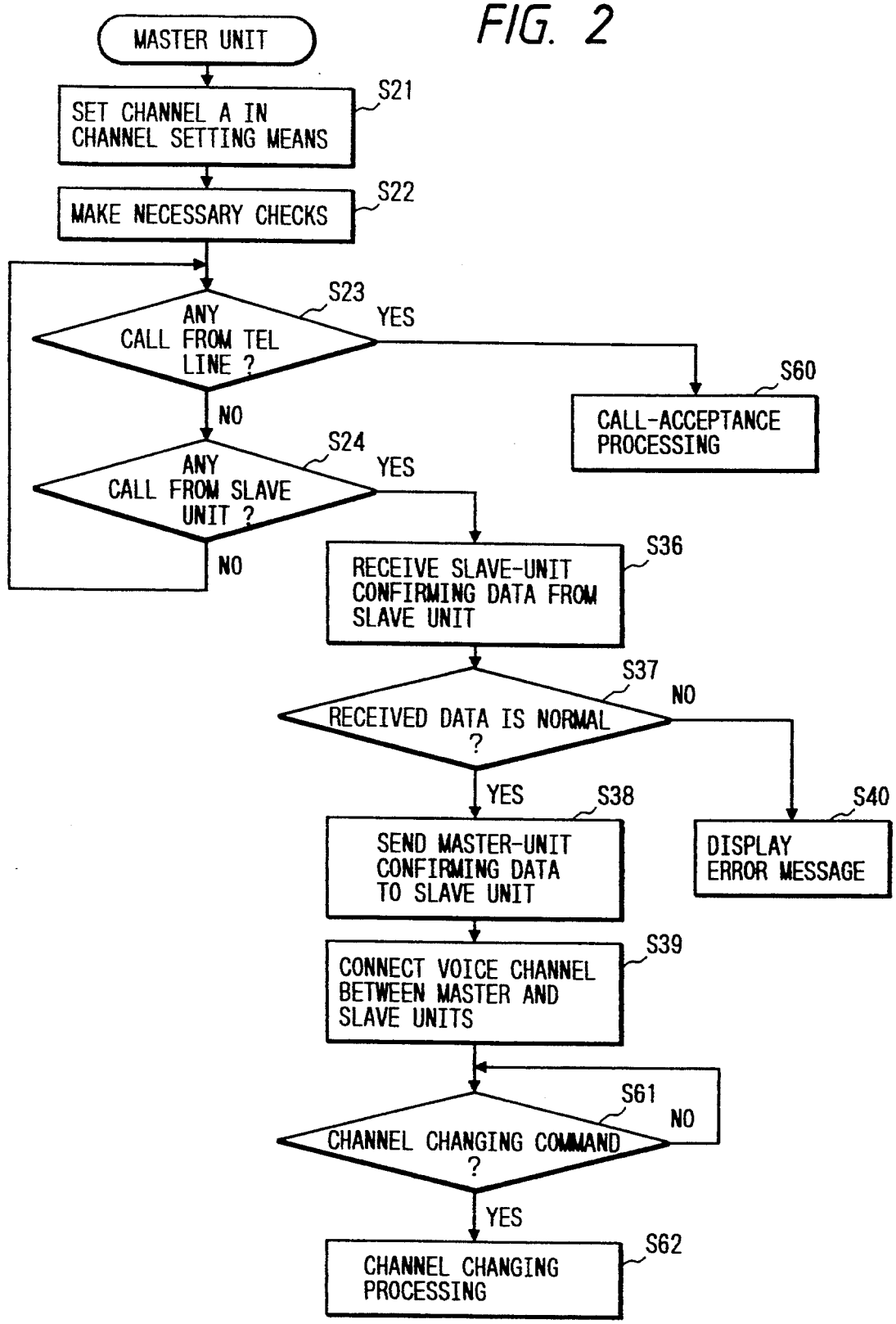
FIG. 2 is a flowchart for illustrating an operation of the master unit of the first embodiment of FIG. 1.
Figure 3:
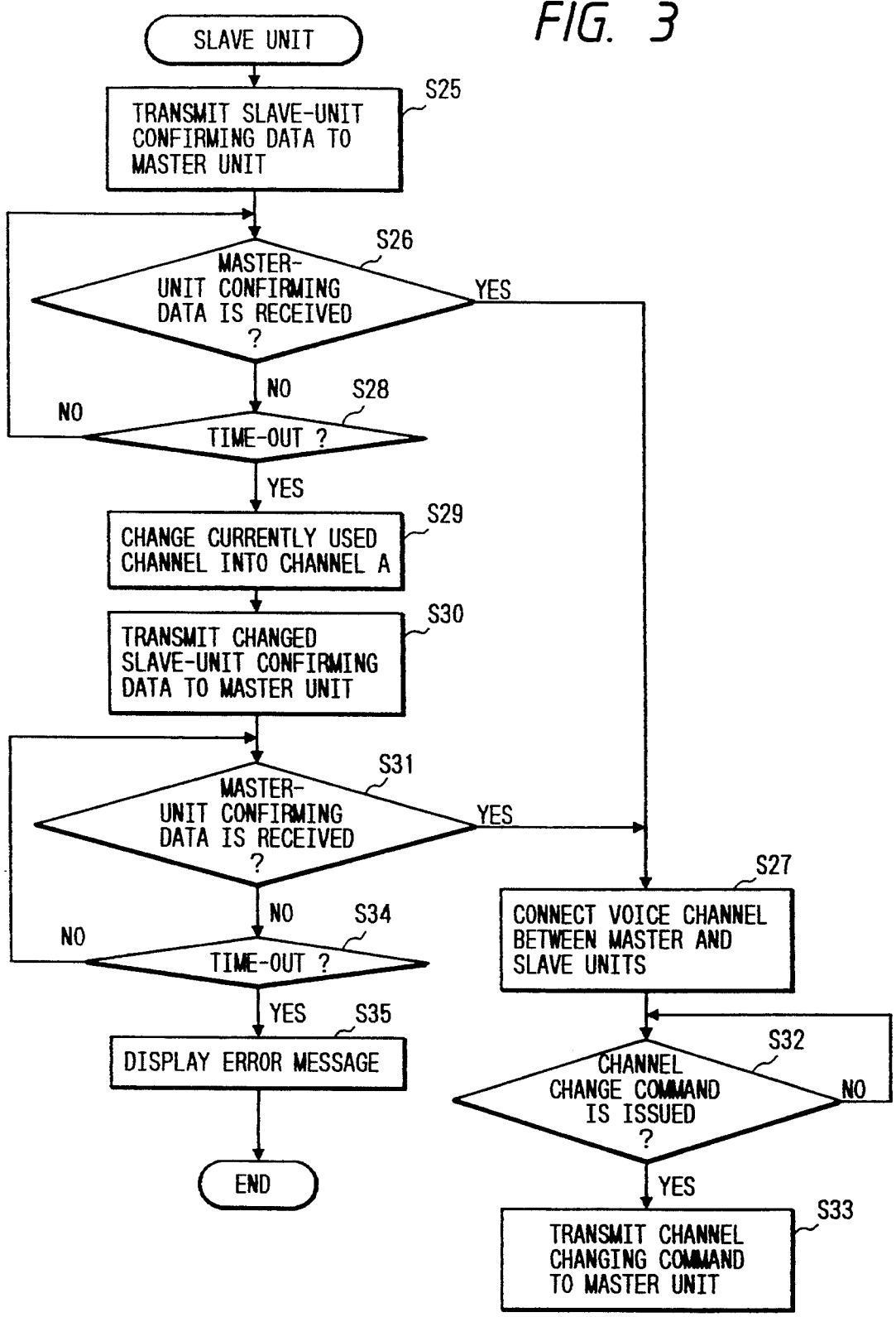
FIG. 3 is a flowchart for illustrating an operation of the slave unit of the first embodiment of FIG. 1.

FIG. 1 is a schematic block diagram for illustrating the configuration of the first embodiment of the present invention. FIG. 2 is a flowchart for illustrating an operation of the master unit of the first embodiment of FIG. 1. FIG. 3 is a flowchart for illustrating an operation of the slave unit of the first embodiment of FIG. 1. In FIG. 1, reference numeral 12 designates the master unit connected to a telephone line; 13 a receiving portion; 14 a transmitting portion; 15 a controlling means; 16 a channel changing means; 17 a channel storing portion; 18 a channel setting means for determining a second channel by performing an operation on an identification code; 19 the slave unit linked with the master unit by using radio wave transmissions; 20 a receiving portion; 21 a transmitting portion; 22 a control means; 23 a channel changing means; 24 a usually-used-channel storing portion; 25 an initially-used-channel storing portion; and 26 a channel setting portion. Further, reference numerals 120 and 190 denote transmission/reception antennas.

Hereinafter, operations of the slave and master units of the cordless telephone having the above described composing elements, as well as an interrelation therebetween, will be described.

Incidentally, a plurality of channels are available for communication between the master and slave units. A user can select an optimum channel from the plurality of channels according to environmental conditions (e.g., another radio equipment, a noise source or the like). Communications can be established between the master and slave units by using the selected optimum channel. In case of this embodiment, it is assumed that a channel (hereunder sometimes referred to as a usually used channel), which is selected and is usually used by a user, is the N-channel.

Further, information indicating an initially used channel, which is set As a result of performing an operation on an identification code by the channel setting means 26 in a predetermined manner, is stored in the initially-used-channel storing portion 25. Incidentally, it is supposed that the initially used channel is a channel A (hereunder sometimes referred to as an A-channel).

First, an operation of the master unit will be described hereinbelow by referring to FIG. 2. Here, it is assumed that as described above, a channel used for a communication between the master and slave units is set as the N-channel (i.e., the usually-used-channel) and that the master and slave units are ready to communicate with each other by using the N-channel. When a power source is connected to the master unit 12 again after the power source has once been disconnected from the master unit 12 (or a power failure occurs), the channel setting means 18 of the master unit 12 Bets the A-channel as the initially-used-channel by using the identification code in step S21. Further, information representing the channel A set as the initially-used-channel is stored in the channel storing portion 17 of the master unit 12. Subsequently, in step S22, the master unit performs necessary checks in accordance with a procedure to be performed when the power source connected thereto is turned on. If such checks are completed, the master unit enters a waiting state, in which the master unit waits for a call transmitted through the telephone line connected thereto or from the slave unit in steps S23 and S24. If it is detected in step S23 that a call is received from the telephone line, a predetermined call acceptance processing is effected in step S60.

Here, an operation of the slave unit 19 will be described hereinbelow by referring to FIG. 3. The cordless telephone commences performing a process of FIG. 3 when a user effects a calling operation in order to make a call. When a user performs a calling operation by using the slave unit 19, the control means 22 of the slave unit 19 reads channel data indicating the usually-used-channel (i.e., the N-channel) from the usually-used-channel storing portion 24. Then, the control means 22 sends slave-unit confirming data (i.e., the read channel data and an identification code predetermined correspondingly to the combination of the master and slave units indicating that the master and slave units are coupled with each other) to the transmitting portion 21. Subsequently, in step S25, the transmitting portion 21 transmits a signal representing the slave-unit confirming data to the master unit 12 by using the N-channel which have been used till that time.

The receiving portion 13 of the master unit 12 is adapted to receive a signal from the slave unit by using the usually-used-channel (i.e., the N-channel) unless disconnection of the power source from the master unit occurs. Thus, if the master unit detects nothing wrong (i.e., no errors) in the received slave-unit confirming data (namely, the received slave-unit confirming data is normal), the master unit 12 sends back master-unit confirming data to the slave unit 19. When the slave unit 19 receives the master-unit confirming data from the master unit 12 through the N-channel in step S26, voice communications can be established in step S27 by connecting a voice channel thereto and using the N-channel.

In the case where the power source connected to the master unit 12 is once turned off and thereafter is turned on again, the initially-used-channel (i.e., the channel A) is set as the contents of the channel setting means 18 of the master unit 12, by performing an operation on the identification code. Therefore, in such a case, the channel indicated by the contents of the channel setting means 18 of the master unit 12 is different from that indicated by the channel data, which is transmitted from the slave unit 19. Thus, the master unit 12 does not send back the master-unit confirming data to the slave unit 19. In step S28, it is determined whether or not a predetermined period of time has passed since the slave unit 19 transmitted the slave-unit confirming data. Hence, this step is called a time-out detecting step.

If a time-out occurs in spite of the fact that the master-unit confirming data is not sent back, the slave unit 19 performs an operation of changing a currently used channel from the usually-used-channel to the initially-used-channel in step 829. Namely, the control means 22 reads the channel data indicating the initially-used-channel (i.e., the channel A) from the initially-used-channel storing portion 25 and changes the frequency used in the receiving portion 20 and the transmitting portion 21 according to the channel data. Next, the control means 22 sends the slave-unit confirming data comprised of such channel data and the identification code to the transmitting portion 21 and further transmits the slave-unit confirming data to the master unit 12 in step S30.

When the slave unit 19 receives the master-unit confirming data, which includes the channel data indicating the channel A, from the master unit 12 in step S31, voice communications can be established in step S27 by connecting a voice channel thereto and using the N-channel.

If a channel changing operation is effected by a user in such a state in step S32, the slave unit 19 transmits a channel changing command signal, as well as channel data representing the usually-used-channel indicated by the user, to the master unit 12 in step SS3.

Subsequently, in step S34, it is determined whether or not a predetermined period of time has passed since the slave unit 19 transmitted the slave-unit confirming data to the master unit 12 through the channel A. Namely, step S34 is also a time-out detecting step. If a time-out occurs in spite of the fact that the master-unit confirming data is not sent back, an error message is displayed in step S35. In such a case, voice communications cannot be established between the master unit 12 and the slave unit 19.

Next, the rest of the operation of the master unit 12 will be described hereunder by referring back to FIG. 2.

If it is detected in step S24 that a signal (i.e., a call) transmitted from the slave unit 19 reaches the master unit 12, the master unit 12 accepts the call and the slave-unit confirming data transmitted from the slave unit 19 in step S36.

If the master unit detects nothing wrong (i.e., no errors) in the received slave-unit confirming data (namely, the received slave-unit confirming data is normal) in step S37, the master unit 12 sends back master-unit confirming data to the slave unit 19 in step S38. Further, voice communications can be established in step S27 by connecting a voice channel thereto in step S39. If the slave unit 19 transmits a channel changing command signal to the master unit 12 then in step S61, an operation of changing a currently used channel from the initially-used-channel to the usually-used-channel is performed according to channel data representing the usually-used-channel, which is transmitted together with the channel changing command signal from the slave unit 19. Namely, the control means 15 of the master unit 12 transfers the channel data indicating the usually-used-channel, which is sent from the slave unit 19, to the channel changing means 16 which changes the frequency used in the receiving portion 20 and the transmitting portion 21 according to the channel data in step S62. As the result, the usually-used-channel becomes employed as a channel to be used by the master unit 12. Thus, similarly as before the power source is disconnected from the master unit 12, the same usually-used-channel (i.e., the N-channel) becomes employed as communication channels respectively used by the master unit 12 and the slave unit 19. Consequently, the master and slave units can communicate with each other. Further, if any error is found in the slave-unit confirming data in step S37, an error message is displayed in step S40. In such a case, voice communications cannot be established between the master unit 12 and the slave unit 19.

Figure 4:
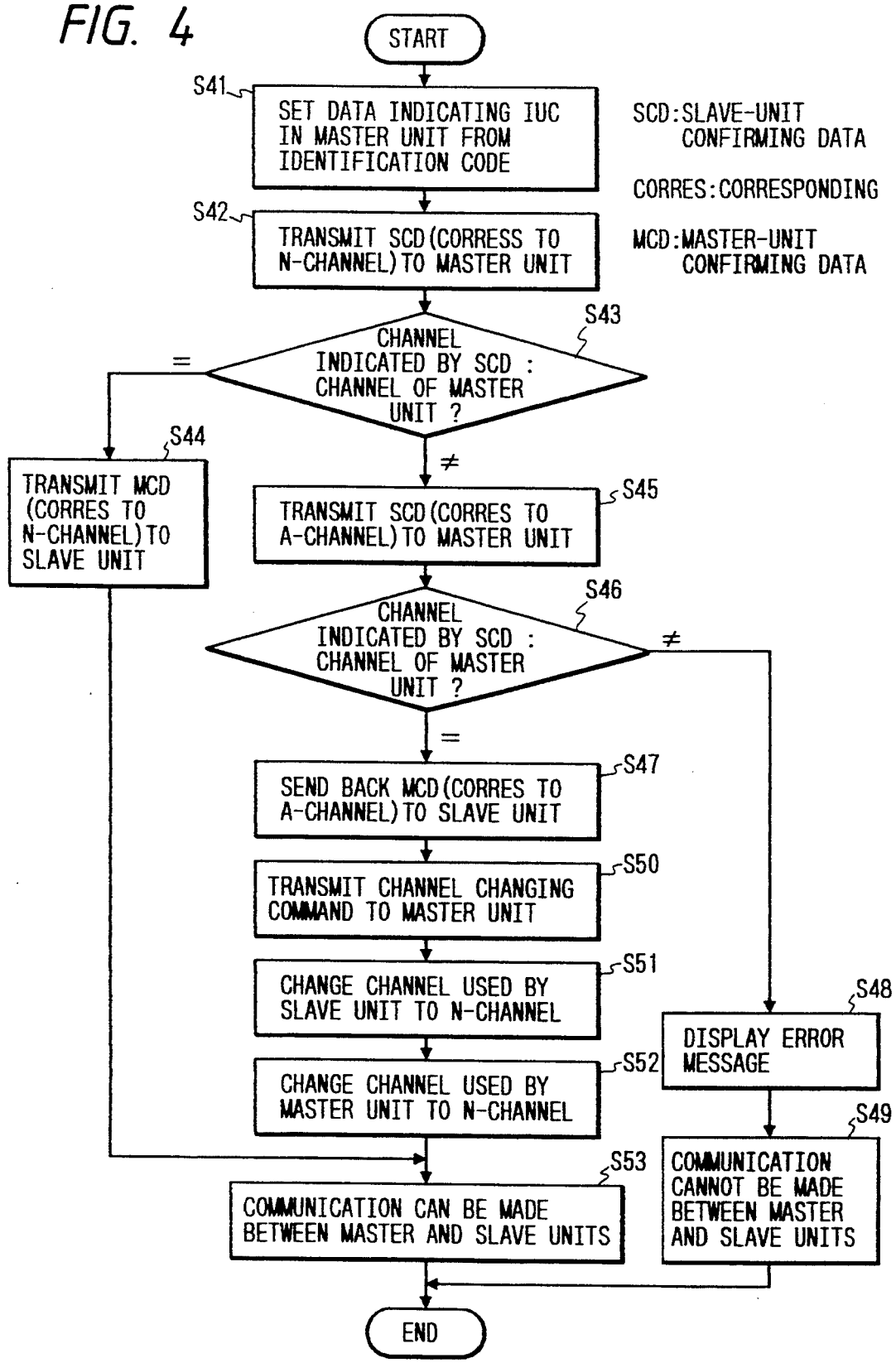
FIG. 4 is a flowchart for illustrating operations of the master and slave units of another embodiment (hereunder sometimes referred to as a second embodiment) of the present invention.
Figure 5:
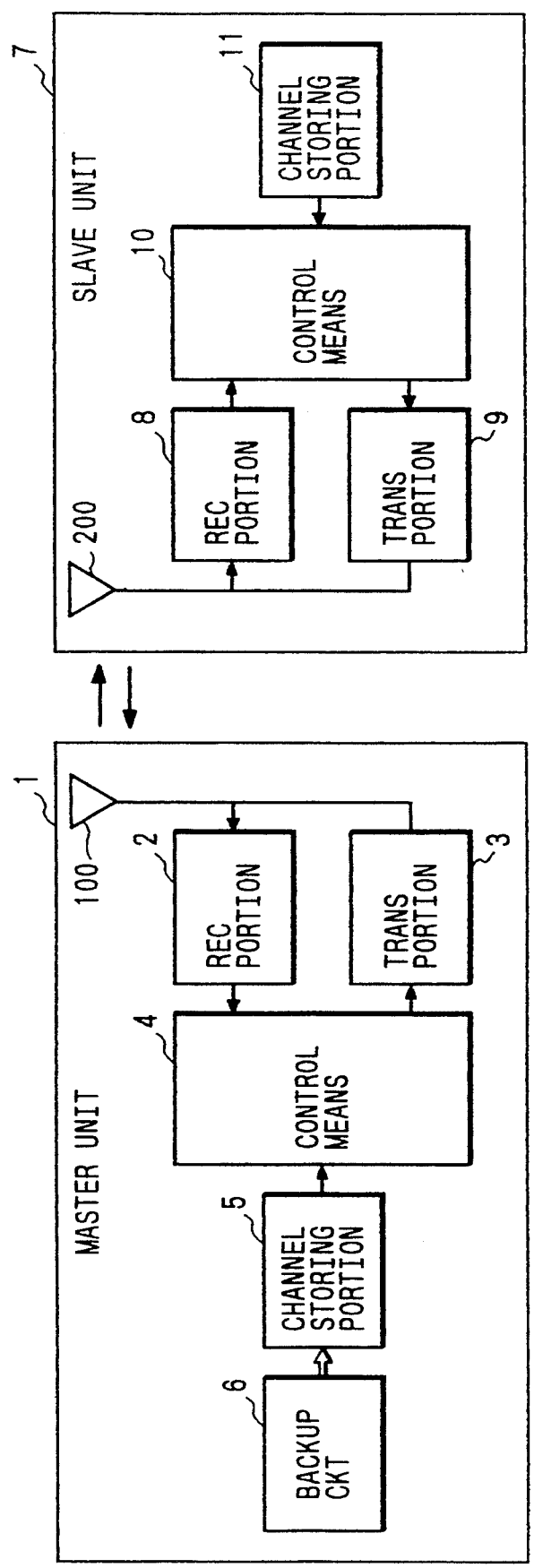
FIG. 5 is a schematic block diagram for illustrating the configuration of a conventional cordless telephone.

Next, a second embodiment of the present invention will be described in detail hereinafter by referring to FIG. 4. Incidentally, the configuration of the second embodiment is the same as that of the first embodiment of FIG. 1 except that a control signal channel for transmitting signals representing information (e.g., an identification code) between the master and slave units in addition to a communication channel for transmitting communication data is to be used for communications therebetween.

Further, it is supposed that a channel used by both of the master unit 12 and the slave unit 19 is the usually-used-channel (i.e., the N-channel). When the power source is once disconnected from the master unit 12 and thereafter is connected thereto again, the channel setting means 18 of the master unit 12 sets the initially-used-channel (i.e,, the channel A) therein by using the identification code in step S41. Further, information representing the initially-used-channel (i.e., the channel A) is stored in the channel storing portion 17 of the master unit 12.

Hereinafter, will be described an operation of the second embodiment in case a user operates the slave unit 19 in order to make a call. When a user performs a calling operation by using the slave unit 19, the control means 22 of the slave unit 19 reads channel data indicating a currently used channel (i.e., the usually-used-channel (more particularly, the N-channel)) from the usually-used-channel storing portion 24. Subsequently, the control means 22 sends the read channel data, as well as an identification code established correspondingly to the combination of the master and slave units indicating that the master and slave units are coupled with each other, to the transmitting portion 21. Next, in step S42, the transmitting portion 21 transmits a signal representing slave-unit confirming data composed of the channel data and the identification code to the master unit 12 by using the control signal channel.

The receiving portion 13 of the master unit 12 is always in a standby mode in which a signal can be received from the slave unit through the control signal channel. The slave-unit confirming data sent from the slave-unit through the control signal channel is received by the receiving portion 13 of the master unit 12. Thereafter, the master unit 12 transfers the received slave-unit confirming data to the control means 15.

If it is found in step S43 that the channel indicated by the channel data of the slave-unit confirming data transferred to the control means 15 is not the same as the channel to be used by the master unit 12, the master unit sends back no signals to the slave unit 19 which waits for master-unit confirming data sent back from the master unit 12. If no master-unit confirming data has been sent back to the slave unit 19 in a predetermined period of time since the slave unit 19 transmits the slave-unit confirming data to the master unit 12, it is determined that no communication can be established between the master and slave units through the channel.

In the case where the power source connected to the master unit 12 is once turned off and thereafter is turned on again as above described, the initially-used-channel (i.e., the A-channel) is set as the contents of the channel setting means 18 of the master unit 12 by performing an operation on the identification code. Therefore, in such a case, the channel indicated by the contents of the channel setting means 18 of the master unit 12 is different from that indicated by the channel data, which is transmitted from the slave unit 19. Thus the master unit 12 and the slave unit 19 cannot communicate with each other.

In contrast, if it is found in step S43 that the channel indicated by the channel data of the slave-unit confirming data transferred to the control means 15 is the same as the channel to be used by the master unit 12, the master unit sends back master-unit confirming data, the channel data of which indicates the N-channel, to the slave unit 19 in step S44. As described previously, the master-unit confirming data consists of the channel data, which indicates a channel currently used by the master unit 12, and the identification code. Further, the master-unit confirming data is transmitted from the master unit to the slave unit when it is confirmed that the currently used channel set in the master unit is the same as that used by the slave unit. As the result, the master and slave units come to be able to communicate with each other in step S53.

Meanwhile, in the case where it is found in step S43 that the channel indicated by the channel data of the slave-unit confirming data transferred to the control means 15 is not the same as the channel to be used by the master unit 12 and thus the master unit 12 sends back no signals to the slave unit 19, the control means 22 reads channel data indicating the initially-used-channel (i.e., the channel A) from the initially-used-channel storing portion 25. Then, the control means 22 sends slave-unit confirming data consisting of the read channel data and the identification code (indicating that a communication channel used by the master unit is the same as a communication channel used by the slave unit) to the transmitting portion 21. Similarly, as in the above described case, the slave-unit confirming data is transmitted to the master unit 12 by using the control signal channel in step S45.

The slave-unit confirming data sent from the slave unit 19 through the control signal channel is received by the receiving portion 13 of the master unit 12. The received slave-unit confirming data is transferred to the control means 15. Subsequently, in step S46, the control means 15 checks whether or not the channel indicated by the channel data of the transferred slave-unit confirming data is the same as the channel used by the master unit 12.

In the case where it is consequently confirmed that the channel indicated by the channel data of the transferred slave-unit confirming data is the same as the channel used by the master unit 12, the channel data and the identification code are transmitted to the transmitting portion 14 as master-unit confirming data and then the transmitting portion 14 sends back the master-unit confirming data to the slave unit 19 in step S47.

In contrast, in the case where the channel indicated by the channel data of the transferred slave-unit confirming data is not the same as the channel used by the master unit 12, an error message is displayed in step S48. In this case, no communication can be established between the master and slave units in step S49.

When the slave unit 19 receives the master-unit confirming data transmitted from the master unit 12 at the receiving portion 20 thereof in step S47, the received master-unit confirming data is transferred to the control means 22. Thus, when receiving the master-unit confirming data, the control means 22 can confirm that both of the slave unit 19 and the master unit 12 use the same initially-used-channel.

Next, in step S50, the control means 22 reads channel changing data indicating the N-channel (i.e., the usually-used-channel) having been used before the power source is disconnected from the usually-used-channel storing portion 24 and sends the read channel changing data to the transmitting portion 21 which further transmits the channel changing data to the master unit 12. In addition, the communication channel is changed by the channel changing means 23 into the usually-used-channel (i.e., the N-channel) in step S51.

Subsequently, the master unit 12 receives the channel changing data transmitted through the control signal channel at the receiving portion 13 thereof. Then, the received channel changing data is transferred to the control means 15. Thereafter, the control means 15 causes the channel changing means 16 to change the currently-used-channel into the usually-used-channel (i.e., the N-channel) in step S52. Thus, the channel used by the master unit 12 becomes the usually-used-channel (i.e., the N-channel). Consequently, the communication channel used in common by the master unit 12 and the slave unit 19 becomes the N-channel which is the usually-used-channel before the power source is disconnected from the master unit 12. As the result, the master and slave units come to be able to communicate with each other in step S53.

As above stated, in cases of the embodiments of the present invention, information representing the usually-used-channel, which is currently used by the master and slave units, and information representing the initially-used-channel are stored in the slave unit. Thus, even when the power source is turned off or or disconnected from the master unit for a long time and as the result the information representing the usually-used-channel which has been used is lost, the master and slave units can return to a normal condition by making the communication channel used by the master unit be in agreement with that used by the slave unit (namely, changing the communication channel used by the master unit to the usually-used-channel, which has been used in common by the master and slave units immediately before the power source is turned off or or disconnected from the master unit) by using the initially-used-channel indicated by information stored in the slave unit and performing an exchange of the master-unit confirming data and the slave-unit confirming data between the master and slave units. Additionally, the slave unit is always driven by using a battery. Thus, the slave unit always holds the information representing the usually-used-channel therein. The cordless telephone of the present invention is also characterized by this. Thereby, even in the case where the power source is once disconnected from the master unit and thereafter is connected thereto again, a communication can be resumed between the master and slave units in the above described manner. Incidentally, the situations can be interchanged between the master and slave units. Even in such a case, the occurrence of a discrepancy between the communication channels used by the master and slave units (namely, the occurrence of a situation in which no communication can be made between the master and slave units) can be prevented.

Moreover, the information representing the initially-used-channel is set in the embodiments on the basis of the identification code. Therefore, the initially-used-channel is not necessarily limited to a specific channel (namely, the initially-used-channel may be selected from a plurality of channels) similarly as the identification code. Even if a cordless telephone of the same type is installed near another cordless telephone, occurrence of a radio interference can be prevented by making these cordless telephones have different identification codes (namely, different initially-used-channels).

While the preferred embodiments of the present invention have been described above, it is to be understood that the present invention is not limited thereto and that other modifications will be apparent to those skilled in the art without departing from the spirit of the invention.

For example, in the above described embodiments, information representing the communication channel is stored in the storing means. A counter means or the like may be employed instead of the storing means. Further, in the case where no communication can be made by using the usually-used-channel, the currently used channel is changed by the channel changing means to the initially-used-channel. Then, similarly as in the above described embodiments, a transmission and a reception of the master-unit confirming data and the slave-unit confirming data are effected by using the initially-used-channel. In such a case, an operation similar to the operation of the embodiment can be performed by using the initially-used-channel as a channel for transmitting control date. Moreover, in the above described embodiments, an error message is displayed. However, a sounding means may be employed instead of a displaying means. Thus, an error message may be sounded instead of being displayed. Additionally, in the foregoing embodiments, the usually-used-channel storing portion and the initially-used-channel storing portion are provided in the slave unit. However, the usually-used-channel storing portion and the initially-used-channel storing portion may be provided in the master unit or in both of the master and slave units. Thereby, the cordless telephone can cope with a situation in which the battery provided in the slave unit is run down.

The scope of the present invention, therefore, is to be determined solely by the appended claims.

What is claimed is:

1. A cordless telephone having a master unit and a slave unit and using a plurality of communication channels for communication between the master unit and the slave unit and employing an identification code indicating that the master unit and the slave trait are coupled with each other, the master unit having first channel changing means responsive to a user's operation for freely changing a communication channel currently being used by the master unit, the slave unit having second channel changing means responsive to a user's operation for freely changing a communication channel currently being used by the slave unit, storage means for storing information representing a usually-used-channel, receiving means for receiving information, transmitting means for transmitting information, control means for controlling the second channel changing means and the storage means and the transmitting means, wherein the master unit transmits and receives a signal through an initially-used-channel determined from the identification code, wherein, in case the master unit does not normally reply to the slave unit when the slave unit transmits a signal to the master unit, the control means causes the second channel changing means to change the communication channel currently being used by the slave channel into the initially-used-channel and then causes the receiving means and the transmitting means to perform an exchange of data with the master unit through the initially-used-channel and further causes the transmitting means to transmit information representing the usually-used-channel stored in the storage means through the initially-used-channel.

2. A cordless telephone having a master unit driven by an external power source and a slave unit driven by a battery and using a plurality of communication channels for communication between the master unit and the slave unit and employing an identification code indicating that the master unit and the slave unit are coupled with each other, the master unit having first transmitting means for transmitting data, first receiving means for receiving data, first channel changing means for changing a communication channel currently being used by the master unit, first storage means for storing information representing a usually-used-channel, second storage means for storing information representing a predetermined initially-used-channel and first channel setting means for setting the initially-used-channel predetermined according to the identification code and for controlling the first channel changing means in response to a user's operation in such a manner to freely change the communication channel currently being used by the master unit, the slave unit having second transmitting means for transmitting data, second receiving means for receiving data, second channel changing means for changing a communication channel currently being used by the slave unit, third storage means for storing the information representing the usually-used-channel, fourth storage means for storing the information representing the predetermined initially-used-channel and second channel setting means for setting the initially-used channel predetermined according to the identification code and for controlling the second channel changing means in response to a user's operation in such a manner to freely change the communication channel currently being used by the slave unit, wherein the master unit transmits and receives a signal through the predetermined initially-used-channel indicated by the information stored in the second storage means when the power source connected thereto is turned on, wherein, in case the master unit does not normally reply to the slave unit when the second transmitting means of the slave unit transmits a signal to the master unit, the second channel changing means reads the information representing the initially-used-channel from the fourth storage means and changes the communication channel currently being used by the slave channel according to the information read from the fourth storage means into the initially-used-channel and the second transmitting means of the slave unit transmits a signal again to the master unit through the initially-used-channel, wherein in case the master unit replies to the signal transmitted again from the second transmitting means, the slave unit transmits to the master unit a signal directing the first channel changing means to change the communication channel used by the master unit into the usually-used-channel according to the information representing the usually-used-channel stored in the first storage means.

3. A cordless telephone having a master unit driven by an external power source and a slave unit driven by a battery and using a plurality of communication channels for communication between the master unit and the slave unit and employing an identification code indicating that the master unit and the slave unit are coupled with each other, said identification code being stored in a first and second channel setting means, the master unit having first transmitting means for transmitting data, first receiving means for receiving data, first channel changing means for changing a communication channel currently being used by the master unit, first storage means for storing information representing a usually-used-channel, first channel setting means for setting information representing an initially-used-channel predetermined correspondingly to the identification code in the first channel setting means when the power source connected to the master unit is turned on, second storage means for storing the information representing the initially-used-channel set in the first channel setting means and first control means for controlling the first channel changing means in response to a user's operation in such a manner to change the communication channel currently being used by the master unit, the slave unit having second transmitting means for transmitting data, second receiving means for receiving data, second channel changing means for changing a communication channel currently being used by the slave unit, third storage means for storing the information representing the usually-used-channel, second channel setting means for setting information representing initially-used-channel predetermined correspondingly to the identification code in the second channel setting means, fourth storage means for storing the information representing the initially-used-channel set in the second channel setting means and second control means for controlling the second channel changing means in response to a user's operation in such a manner to change the communication channel currently being used by the slave unit, wherein the master unit transmits and receives a signal through the initially-used-channel indicated by the information stored in the second storage means when the power source connected thereto is turned on, wherein in case the master unit does not normally send back first confirmation data representing the communication channel currently being used by the master unit and the identification code to the slave unit when the second transmitting means of the slave unit transmits second confirmation data representing the communication channel currently being used by the slave unit and the identification code to the master unit, the second control means causes the second channel changing means to read the information representing the initially-used-channel from the fourth storage means and change the communication channel currently being used by the slave channel according to information read from the fourth storage means into the initially-used-channel and thereafter the second transmitting means of the slave unit transmits the second confirmation data, which represents the changed communication channel currently being used by the slave unit and the identification code, again to the master unit through the initially-used-channel, wherein in case the master unit sends back the first confirmation data in response to the second confirmation data transmitted again from the second transmitting means, the slave unit transmits to the master unit a signal directing the first channel changing means to change the communication channel currently being used by the master unit into the usually-used-channel according to the information representing the usually-used-channel stored in the first storage means.

4. A cordless telephone having a master unit and a slave unit and using a plurality of communication channels for communication between the master unit and the slave unit and employing an identification code indicating that the master unit and the slave unit are coupled with each other, the master unit having first channel setting means responsive to a user's operation for freely changing a communication channel currently being used by the master unit, the slave unit having second channel setting means responsive to a user's operation for freely changing a communication channel currently being used by the slave unit, wherein the master unit transmits and receives a signal through an initially-used-channel determined from the identification code, wherein in case the master unit does not normally reply to the slave unit when the slave unit transmits a signal to the master unit, the slave unit changes the communication channel currently being used by the slave channel into the initially-used-channel and then transmits a signal again to the master unit through the initially-used-channel.

5. The cordless telephone according to claim 4, wherein the slave unit further comprises storage means for storing information representing the initially-used-channel determined from the identification code, wherein, in case the master unit does not normally reply to the slave unit when the slave unit transmits a signal to the master unit, the slave unit reads the information representing the initially-used-channel from the storage means and changes the communication channel currently being used by the slave channel into the initially-used-channel according to the read information and then transmits a signal again to the master unit through the initially-used-channel.

* * * * *